(12) United States Patent
Cogan

(10) Patent No.: US 9,977,771 B2
(45) Date of Patent: May 22, 2018

(54) SYSTEM AND METHOD FOR PRINTABLE DOCUMENT VIEWER OPTIMIZATION

(71) Applicant: PTI Marketing Technologies Inc., Solana Beach, CA (US)

(72) Inventor: Douglas Neal Cogan, Brookfield, IL (US)

(73) Assignee: PTI MARKETING TECHNOLOGIES INC., Solana Beach, CA (US)

(*) Notice: Subject to any disclaimer, the term of this patent is extended or adjusted under 35 U.S.C. 154(b) by 253 days.

(21) Appl. No.: 13/827,173

(22) Filed: Mar. 14, 2013

(65) Prior Publication Data

US 2014/0281940 A1 Sep. 18, 2014

(51) Int. Cl.
G06F 17/20 (2006.01)
G06F 17/24 (2006.01)
G06F 3/12 (2006.01)

(52) U.S. Cl.
CPC ............ *G06F 17/24* (2013.01); *G06F 3/1208* (2013.01); *G06F 3/1256* (2013.01); *G06F 3/1288* (2013.01)

(58) Field of Classification Search
None
See application file for complete search history.

(56) References Cited

U.S. PATENT DOCUMENTS

| | | | |
|---|---|---|---|
| 4,839,829 A | 6/1989 | Freedman | |
| 4,850,028 A | 7/1989 | Kawamura et al. | |
| 5,367,619 A | 11/1994 | Dipaolo et al. | |
| 5,586,241 A | 12/1996 | Bauermeister et al. | |
| 5,694,551 A | 12/1997 | Doyle et al. | |
| 5,745,712 A | 4/1998 | Turpin et al. | |
| 5,758,126 A | 5/1998 | Daniels et al. | |
| 5,758,327 A | 5/1998 | Gardner et al. | |
| 5,765,138 A | 6/1998 | Aycock et al. | |

(Continued)

FOREIGN PATENT DOCUMENTS

| | | |
|---|---|---|
| EP | 0778535 | 6/1997 |
| EP | 1014255 | 6/2000 |

(Continued)

OTHER PUBLICATIONS

Office Action for U.S. Appl. No. 11/200,861, dated Oct. 2, 2009.

(Continued)

*Primary Examiner* — Keith D Bloomquist
(74) *Attorney, Agent, or Firm* — Cooley LLP

(57) ABSTRACT

In some embodiments a method includes sending, from a composition compute device and to a user compute device, a data file that is based on a print file template. The data file includes (1) a plurality of raster image fonts based on user selected text, (2) a low-resolution image based on a user selected image, and (3) frame data indicative of coordinate locations on a webpage for the raster image fonts and for the low-resolution image. The method includes receiving, at the composition computer device and from the user computer device, a signal indicative of a modification to the data file. The method includes defining, at the composition compute device, a print file based on (1) a plurality of vector fonts based on the user selected text, (2) a high-resolution image based on the user selected image, (3) the frame data, and (4) the modification to the data file.

20 Claims, 4 Drawing Sheets

(56) References Cited

U.S. PATENT DOCUMENTS

| | | | |
|---|---|---|---|
| 5,781,714 A | 7/1998 | Collins et al. | |
| 5,842,178 A | 11/1998 | Giovannoli | |
| 5,884,014 A | 3/1999 | Huttenlocher et al. | |
| 5,911,141 A | 6/1999 | Kelley et al. | |
| 5,911,143 A | 6/1999 | Deinhart et al. | |
| 5,960,164 A | 9/1999 | Dorfman et al. | |
| 5,963,939 A | 10/1999 | McCann et al. | |
| 6,018,774 A | 1/2000 | Mayle et al. | |
| 6,034,785 A | 3/2000 | Itoh | |
| 6,043,826 A | 3/2000 | Manning | |
| 6,055,522 A | 4/2000 | Krishna et al. | |
| 6,067,548 A | 5/2000 | Cheng | |
| 6,073,147 A * | 6/2000 | Chan | G06F 17/214 715/234 |
| 6,092,050 A | 7/2000 | Lungren et al. | |
| 6,161,146 A | 12/2000 | Kley et al. | |
| 6,182,078 B1 | 1/2001 | Whitmyer, Jr. | |
| 6,199,079 B1 | 3/2001 | Gupta et al. | |
| 6,205,452 B1 | 3/2001 | Warmus et al. | |
| 6,226,656 B1 | 5/2001 | Zawadzki et al. | |
| 6,236,409 B1 | 5/2001 | Hartman | |
| 6,308,164 B1 | 10/2001 | Nummelin et al. | |
| 6,327,599 B1 | 12/2001 | Warmus et al. | |
| 6,356,268 B1 | 3/2002 | Beaman et al. | |
| 6,449,053 B2 | 9/2002 | Bando | |
| 6,460,072 B1 | 10/2002 | Arnold et al. | |
| 6,462,756 B1 | 10/2002 | Hansen et al. | |
| 6,498,608 B1 | 12/2002 | Dresevic et al. | |
| 6,529,214 B1 | 3/2003 | Chase et al. | |
| 6,583,887 B1 | 6/2003 | Clouthier et al. | |
| 6,615,188 B1 | 9/2003 | Breen et al. | |
| 6,615,234 B1 | 9/2003 | Adamske et al. | |
| 6,650,433 B1 | 11/2003 | Keane et al. | |
| 6,826,727 B1 | 11/2004 | Mohr et al. | |
| 6,839,149 B2 | 1/2005 | Herr | |
| 6,919,967 B1 | 7/2005 | Pentecost et al. | |
| 6,986,105 B2 | 1/2006 | Walker, Jr. | |
| 7,117,504 B2 | 10/2006 | Smith et al. | |
| 7,120,634 B2 | 10/2006 | Jecha et al. | |
| 7,133,050 B2 | 11/2006 | Schowtka | |
| 7,145,670 B2 | 12/2006 | Keane et al. | |
| 7,268,912 B2 | 9/2007 | Murata | |
| 7,298,516 B2 | 11/2007 | Herr | |
| 7,300,044 B2 | 11/2007 | Stemmle | |
| 7,375,842 B2 | 5/2008 | Kloosterman et al. | |
| 7,437,321 B2 | 10/2008 | Hanechak | |
| 7,490,057 B2 | 2/2009 | Connolly et al. | |
| 7,584,424 B2 | 9/2009 | Hanechak | |
| 7,619,638 B2 | 11/2009 | Walker, Jr. et al. | |
| 7,672,010 B2 | 3/2010 | Hirtenreiter et al. | |
| 8,099,263 B2 | 1/2012 | Walker, Jr. et al. | |
| 8,373,873 B2 | 2/2013 | Negishi | |
| 8,717,596 B2 | 5/2014 | Cogan | |
| 2001/0046066 A1 | 11/2001 | Ueda et al. | |
| 2002/0015179 A1* | 2/2002 | Igarashi et al. | 358/1.15 |
| 2002/0036654 A1 | 3/2002 | Evans et al. | |
| 2002/0087702 A1 | 7/2002 | Mori | |
| 2002/0097418 A1 | 7/2002 | Chang et al. | |
| 2002/0103826 A1 | 8/2002 | Kriho et al. | |
| 2002/0111963 A1 | 8/2002 | Gebert et al. | |
| 2002/0136578 A1 | 9/2002 | Johnson et al. | |
| 2002/0194219 A1 | 12/2002 | Bradley et al. | |
| 2003/0189726 A1 | 10/2003 | Kloosterman et al. | |
| 2004/0073485 A1 | 4/2004 | Liu et al. | |
| 2004/0133924 A1* | 7/2004 | Wilkins et al. | 725/135 |
| 2004/0205609 A1 | 10/2004 | Milton et al. | |
| 2004/0207876 A1 | 10/2004 | Aschenbrenner | |
| 2004/0246254 A1 | 12/2004 | Opstad et al. | |
| 2005/0048458 A1 | 3/2005 | Collins et al. | |
| 2005/0094205 A1 | 5/2005 | Lo et al. | |
| 2005/0240971 A1 | 10/2005 | Koppich et al. | |
| 2006/0259590 A1* | 11/2006 | Tsai | H04L 67/02 709/219 |
| 2006/0279769 A1 | 12/2006 | Ludwig et al. | |
| 2006/0279772 A1 | 12/2006 | Ludwig et al. | |
| 2007/0177181 A1 | 8/2007 | Herr | |
| 2008/0083027 A1 | 4/2008 | Freiman et al. | |
| 2008/0117448 A1* | 5/2008 | Ijams | G06F 17/248 358/1.15 |
| 2008/0120541 A1 | 5/2008 | Cheng | |
| 2008/0259392 A1 | 10/2008 | Tokumoto | |
| 2008/0267491 A1 | 10/2008 | Matsui | |
| 2009/0051947 A1 | 2/2009 | Kuroshima | |
| 2010/0064176 A1 | 3/2010 | Negishi | |
| 2010/0257446 A1 | 10/2010 | Woolfe et al. | |
| 2011/0026042 A1 | 2/2011 | Cogan et al. | |
| 2011/0075196 A1 | 3/2011 | Cogan | |
| 2011/0289407 A1 | 11/2011 | Naik et al. | |
| 2014/0240731 A1 | 8/2014 | Cogan | |
| 2016/0210092 A1 | 7/2016 | Cogan | |

FOREIGN PATENT DOCUMENTS

| | | |
|---|---|---|
| EP | 1026876 | 8/2000 |
| EP | 1031916 | 8/2000 |
| EP | 1471460 | 10/2004 |
| EP | 2163983 | 3/2010 |
| GB | 2324896 | 11/1998 |
| JP | S63-57234 | 3/1988 |
| JP | 2001-216522 | 8/2001 |
| JP | 2001-344313 | 12/2001 |
| JP | 2002-297579 | 10/2002 |
| JP | 2005-022298 | 1/2005 |
| JP | 2005-028876 | 2/2005 |
| JP | 2005-267477 | 9/2005 |
| JP | 2006-344180 | 12/2006 |
| WO | WO 97/27555 | 7/1997 |
| WO | WO 99/19830 | 4/1999 |
| WO | WO 2011/041241 | 4/2011 |
| WO | WO 2014/160100 | 10/2014 |

OTHER PUBLICATIONS

Office Action for U.S. Appl. No. 11/200,861, dated Jun. 21, 2010.
Office Action for U.S. Appl. No. 11/200,861, dated Jun. 8, 2011.
Office Action for U.S. Appl. No. 11/200,861, dated Jan. 19, 2012.
Office Action for U.S. Appl. No. 11/200,861, dated Aug. 30, 2012.
Office Action for U.S. Appl. No. 11/200,861, dated Jun. 3, 2013.
Office Action for U.S. Appl. No. 12/571,387, dated Nov. 22, 2011.
Office Action for U.S. Appl. No. 12/571,387, dated Jul. 24, 2012.
Office Action for U.S. Appl. No. 12/571,387, dated May 2, 2013.
Office Action for U.S. Appl. No. 14/269,802, dated Jun. 19, 2014.
Office Action for U.S. Appl. No. 14/269,802, dated Mar. 17, 2015.
Office Action for U.S. Appl. No. 12/534,717, dated Jan. 30, 2013.
International Search Report and Written Opinion for International Application No. PCT/US2010/050302, dated Dec. 16, 2010.
International Search Report and Written Opinion for International Application No. PCT/US2010/044298, dated Oct. 20, 2010.
International Search Report and Written Opinion for International Application No. PCT/US2014/025814, dated Jul. 11, 2014.
Aberdeen Group Review, "Process-centric applications drive the bottom line: NovaSoft marries the web and the business process," NovaSoft Press Area, Aberdeen Group, Inc., Boston, Massachusettes, (1997) [Retrieved from the Internet Jan. 18, 1999], 7 pages.
Ciancarini, P. et al., "A multi-agent process centered environment integrated with the WWW," Proceedings—The Workshop on Enabling Technologies: Infrastructure for Collaborative Enterprises, US, IEEE Computer Society Press, Los Alamitos, CA, Jan. 1, 1997, pp. 113-120.
Feibus, A., "RequisitePro 3.0 manages requirements, documents," Informationweek, No. 677, pp. 18A-22A, Apr. 13, 1998.
Marotta, M. E., "Detroit: Contracting for quality," Industrial Robot, 20(4):23-25 (1993).
Matrix One, Inc., "Matrix," (1997), [Retrieved from the Internet May 8, 1999], 7 pages.
Sixtus, M., "Das Netz erfindet sich neu: Ein Streifzug durch das Web 2.0," CT Magazin Fuer Computer Technik, 2006(5):144-151 (2006).

(56) References Cited

OTHER PUBLICATIONS

Takegata, S., JSP cho-hyo application jissen kaihatu nyumon, Japan, Rutles, Inc., Nov. 21, 2011, p. 136-138.

* cited by examiner

SYSTEM AND METHOD FOR PRINTABLE DOCUMENT VIEWER OPTIMIZATION

BACKGROUND

Some embodiments described herein relate generally to a system and method for printable document viewer optimization.

Known systems for viewing and modifying print jobs based on printable document templates exist. Such known systems can be high bandwidth, use significant computer resources and/or can be slow. By way of example, known system may require loading and transmission of full font sets, higher resolution images, and/or full documents. In such an example, a user wishing to view and/or modify such a print job may need a compute device including a dedicated local printable document viewing and modification program; Additionally, full font sets, for example, vector font sets can include proprietary information. A system that transmits those full font sets can potentially expose that proprietary information.

Accordingly, a need exists for an improved system and method for printable document viewer optimization.

SUMMARY

In one aspect, a method includes sending, from a composition compute device and to a user compute device, a data file that is based on a print file template. The data file includes (1) a plurality of raster image fonts based on user selected text, (2) a low-resolution image based on a user selected image, and (3) frame data indicative of coordinate locations on a webpage for the raster image fonts and for the low-resolution image. The method includes receiving, at the composition computer device and from the user computer device, a signal indicative of a modification to the data file. The method includes defining, at the composition compute device, a print file based on (1) a plurality of vector fonts based on the user selected text, (2) a high-resolution image based on the user selected image, (3) the frame data, and (4) the modification to the data file.

DETAILED DESCRIPTION

Figure 1:
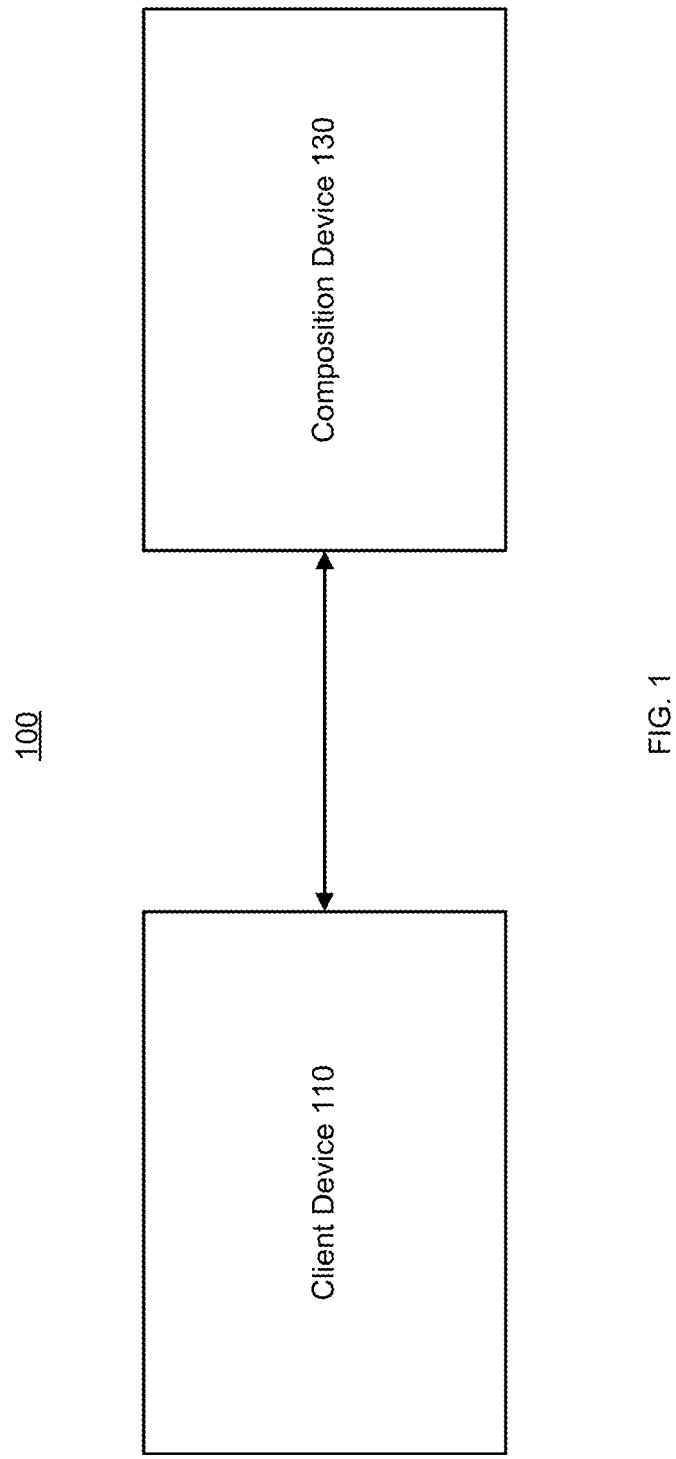
FIG. 1 is a block diagram of a printable document viewer optimization system according to an embodiment.

In one aspect the disclosure relates to a method includes sending, from a composition compute device and to a user compute device, a data file that is based on a print file template. The data file includes (1) a plurality of raster image fonts based on user selected text, (2) a low-resolution image based on a user selected image, and (3) frame data indicative of coordinate locations on a webpage for the raster image fonts and for the low-resolution image. The method includes receiving, at the composition computer device and from the user computer device, a signal indicative of a modification to the data file. The method includes defining, at the composition compute device, a print file based on (1) a plurality of vector fonts based on the user selected text, (2) a high-resolution image based on the user selected image, (3) the frame data, and (4) the modification to the data file.

In another aspect the disclosure relates to a method that includes sending, from a first compute device and to a second compute device, a signal indicative of a selection of a print file template such that the second compute device loads a set of raster image fonts associated with the print file template. The method includes sending, from the first compute device and to the second compute device, a data file including (1) text having been input by a user, and (2) an indication of a section of an image. The method includes receiving, at the first compute device and from the second compute device, a signal indicative of a preview image that is based on (1) the data file, (2) the set of raster image fonts, (3) a low-resolution image based on the user selected image, and (4) frame data associated with the print file template. The method includes sending, from the first compute device and to the second compute device, a signal indicative of a modification of the data file. The method includes receiving, at the first compute device and from the second compute device, an indication of the definition of a print file based on (1) a set of vector fonts based on the user selected text, (2) a high resolution image based on the user selected image, and (3) the frame data, and (4) the modification to the data file.

In a further aspect the disclosure relates to an apparatus that includes a composition compute device configured to send, to a user compute device, a data file that is based on a print file template. The data file includes (1) a plurality of raster image fonts based on user selected text, (2) a low-resolution image based on a user selected image, and (3) frame data indicative of coordinate locations on a webpage for the raster image fonts and for the low-resolution image. The composition computer device configured to receive, from the user computer device, a signal indicative of a modification to the data file. The composition computer device configured to define a print file based on (1) a plurality of vector fonts based on the user selected text, (2) a high resolution image based on the user selected image, (3) the frame data, and (4) the modification to the data file.

As used in this specification, the singular forms "a," "an" and "the" include plural referents unless the context clearly dictates otherwise. Thus, for example, the term "a client device" is intended to mean a client device or a combination of client devices.

As used in this specification, a printable document template can be a template including data to define printable documents and print files. A printable document template can include frame and coordinate data that includes, for example, the layout (columns, etc), coordinate location of text and image locations (x,y coordinates, etc), font characters and style, images, etc. The printable document template can be associated with a full capability font set ("full font set") that can includes vector fonts for use by a raster image processor and configured to provide any font character in the full font set in a variety of sizes. The full font set can be configured to be processed into a downgraded capability font set ("downgraded font set") that can include raster fonts, rasterized from corresponding vector fonts, for use by a printable document viewer and configured to provide a subset of characters and/or sizes as included in the printable document template. The printable document can be associated with a higher resolution image or set of images for use by a raster image processor. The printable document template can be associated with a lower resolution image or set of images corresponding to the higher resolution image or set of images for use by the printable document viewer. A printable document template, and subsequently, a print file can start with text and no images, or can start with images and no text. In such embodiments, a user can add text and/or images during a editing/modification process.

As used in this specification a printable document can include a file configured to be printed and/or a document configured to be processed into a file configured to be printed, for example, a print file. A print file can include, for example, a PPML, VDX, PDF/VT, postscript, AFP, VPS, JLYT, VIPP, or other type of print file used in the commercial print industry, e.g. data files used by the raster image processor.

As is discussed below, a printable document viewer optimization system can be used to define a printable document on a compute device based on a template stored on a composition device. Specifically such as a system can reduce an amount of data sent between the compute device and the composition device. More specifically such a system can be configured such that the compute device handles low resolution images, downgraded fonts, and coordinate layouts, and such that the composition device handles higher resolution images, full feature fonts, and rasterization of the printable document. FIG. 1 depicts a block diagram of a printable document viewer optimization system ("system") 100. System 100 includes a compute device 110 and a composition device 130. Compute device 110 is configured to be operatively coupled to composition device 130.

Compute device 110 can include a communication module (not shown in FIG. 1), an input/output module (not shown in FIG. 1), a display module (not shown in FIG. 1), and a processor module (not shown in FIG. 1). Compute device 110 can be configured to communicate over a network, such as, for example, the internet, with composition device 130. Compute device 110 can also be configured to facilitate interaction between a user and composition device 130. Specifically, compute device 110 can be configured to provide a gateway for a user to define a printable document print file. In some embodiments, compute device 110 can include, for example, a personal computer, a workstation terminal, a portable computing device such as a personal digital personal digital assistant (PDA), a standard mobile telephone, and/or a tablet personal computer (PC), and/or the like. In some embodiments, compute device 110 can be configured to execute a browser based program, for example a network browser. Compute device 110 can be configured to execute a printable document viewer and/or editing process and/or program. The printable document viewer and/or editor process and/or program can be a software and/or firmware program embodied in a non-transitory processor-readable medium storing code representing instructions to cause a processor to implement the program.

Compute device 110 can include the communication module configured to operatively couple compute device 110 to one or more networks. Specifically, the communication module can be configured to operative couple compute device 110 to the one or more networks via a wired connection, such as for example, Ethernet, fiber channel, a serial bus, etc, and/or via a wireless connection, such as for example, using Wireless Fidelity (Wi-Fi), Bluetooth, cellular (such as a third generation mobile telecommunications (3G) or a fourth generation mobile telecommunications (4G)), or any other wireless communication standard. In some embodiments, the communication module can include a communication card/chip including, for example, a wireless antenna(s), communication ports, etc. The communication card can be configured to receive signals, data and/or other transmitted information from composition device 130 and can communicate that transmitted data to the input/output module, the display module, and/or the processor module. The communication module can receive signals, data and/or other transmitted information from the input/output module, the display module, and/or the processor module, for example, based on a user input, and can communicate that transmitted data to composition device 130 via the network.

Compute device 110 can include the input/output module configured to facilitate interaction between a user and compute device 110 and/or composition device 130. The input/output module can include and/or can be configured to be coupled to inputs, such as for example, computer peripherals, touch screens, haptic inputs, user tracking inputs, and/or the like. The input/output module can be configured to direct user and/or other inputs to other elements of compute device 110, for example to the communication module for transmission to composition device 130, to the display module for a visual representation of the input and/or of the results on an input, and/or to the processor module. In some embodiments, the input/output module can facilitate selection of a printable document template, personalization and/or modification of the a printable document template, selection of text, characteristics of text, images, characteristics of images, orientation or any aspect of a printable document template, and/or the like, indications of an approval and/or disapproval of a printable document and/or preview based on the printable document template, etc.

Compute device 110 can include the display module configured to display and/or cause to be displayed, printable document templates, printable document previews based on printable document templates, and/or can allow a user to select, personalize/modify, and/or otherwise manipulate the same. In some embodiments, the display module can include a display, such as for example, a liquid crystal, light emitting diode, or cathode ray tube display, and/or can include a display computer chip/card configured to cause the display to display images associate with system 100. In such embodiments, the display can include touch, haptic, motion and/or other like characteristics. The display module can communication with the input/output module, the communication module, and/or the processor module to facilitate selection of a printable document template, personalization and/or modification of the a printable document template, selection of text, characteristics of text, images, characteristics of images, orientation or any aspect of a printable document template, and/or the like, indications of an approval and/or disapproval of a printable document and/or preview based on the printable document template, etc.

Compute device 110 can include the processor module configured execute a printable document viewer and/or editing process and/or program. The processor module can include a computer processor and/or memory, for example a random access memory (RAM), a memory buffer, a hard drive, a database, an erasable programmable read-only memory (EPROM), an electrically erasable read-only memory (EEPROM), and/or so forth. The processor module can be configured to execute the printable document viewer and/or editing process and/or program in, for example, a network browser. The processor module can execute, via, for example, the network browser, a dynamic image rendering process and/or program that is configured to receive data streams, for example markup language data streams, and render a preview image based on frame and coordinate information, font information, and/or image information included in the data file and/or stream ("data stream"). In this manner, the processor module can output a signal indicative of the preview image to the display module to be viewed by a user. The processor module can be configured to receive signals indicative of a modification to a template, for example, from a user via the input/output module, and can transmit signals indicative of the modification to the composition device 130.

System 100 includes composition device 130 that can include a communication module (not shown in FIG. 1), a storage module (not shown in FIG. 1), and a composition module (not shown in FIG. 1). Composition device 130 can be configured to communicate over a network, such as, for example, the internet, with compute device 130. Composition device 130 can also be configured to store printable documents templates and associated fonts, images, and/or the like, and can be configured to facilitate the personalization/modification, processing, and/or composition of printable documents templates, printable documents, and/or previews of printable document templates and/or printable documents. In some embodiments, composition device 130 can include, for example, a server and/or workstation computer/terminal. In some embodiments, composition device 130 can be configured to execute a printable document storage, modification, and or composition process and/or program that can interact with a browser based program operated by compute device 110. The printable document storage, modification, and or composition process and/or program can be a software and/or firmware program embodied in a non-transitory processor-readable medium storing code representing instructions to cause a processor to implement the program.

Composition device 130 can include the communication module configured to operatively couple composition device 130 to one or more networks. Specifically, the communication module can be configured to operative couple composition device 130 to the one or more networks via a wired connection, such as for example, Ethernet, fiber channel, a serial bus, etc, and/or via a wireless connection, such as for example, using Wireless Fidelity (Wi-Fi), Bluetooth, cellular (such as a third generation mobile telecommunications (3G) or a fourth generation mobile telecommunications (4G)), or any other wireless communication standard. In some embodiments, the communication module can include a communication card/chip including, for example, a wireless antenna(s), communication ports, etc. The communication card can be configured to receive signals, data and/or other transmitted information from compute device 110 and can communicate that transmitted data to, the storage module and/or the composition module. The communication module can receive signals, data and/or other transmitted information from the template module, the storage module, the modification module and/or the composition module and can communicate that transmitted data to compute device 110 via the network.

Composition device 130 can include the composition module configured to facilitate the selection, organization and manipulation of printable document templates, to define printable document templates and/or printable document previews, and/or to compose printable documents for printing, and/or to define data streams representative of the same. In some embodiments, composition module can be configured to receive, via, for example, the communication module, printable document templates designed at compute device 110, designed at a design device (not shown), and or can include software and/or hardware to allow a user to design printable document templates. The composition module can be operatively coupled to, and can store printable document templates in the storage module. In some embodiments, the composition module can receive via the communication module a signal indicative of a selection of a printable document template stored in the storage module, can retrieve the printable document template from the storage module, and can send a data stream representative of a preview including and/or based on the printable document template, a portion of the printable document template and/or a downgraded printable document template. In such embodiments, the composition module can be configured to define (e.g. rasterize in real time) and/or otherwise retrieve a downgraded font set based on a full font set associated with a printable document template, can be configured to define and/or otherwise retrieve a lower resolution image based on a higher resolution image associated with the printable document template, and can be configured to convert the downgraded font set, lower resolution image, and frame and coordinate data associated with the printable document template into a markup language data stream configured to be processed and displayed by compute device 110. In this manner, system 100 can transmit a data stream that uses a lower relative amount of bandwidth, and can protect the proprietary data included in the vector fonts sets and/or high resolution images, for example, to prevent a user of compute device 110 from using the vector font set and/or high resolution images to produce printable documents outside of system 100.

In some embodiments, the composition module can receive a signal indicative of a modification to a printable document template. In such embodiments, the indication of the modification can be received from compute device 110 via the network, and can include only the requested changes to the printable document template. Said another way, the composition module may not receive a modified printable document template, or the printable document template and an indication of the modifications, but only the indication of modification. In such embodiments, modification to the printable document template can include different font size and/or style, different font characters, different images and/or image sizes, and/or new coordinate locations of characters and/or images, and/or the like. In some embodiments, the composition can, in response to receiving the indication of the modification, send to the compute device 110 a data stream indicative of modified preview file, as a markup language stream, including the modifications requested by the user. In some embodiments, original aspects of the template previously transmitted may not be transmitted.

In some embodiments, the composition module can receive an indication from a user of compute device 110 that the printable document is final, and can compose a print file for printing, e.g., a print file configured to be rasterized by a raster image processor (not shown). In such embodiments, the print file can include a full font set and/or high resolution images. In such embodiments, the print file can includes PPML, VDX, PDF/VT, postscript, AFP, VPS, JLYT, VIPP, or other type of print file used in the commercial print industry, e.g. data files used by the RIP.

Composition device 130 can include the storage module configured to store printable document template and fonts and images associated with printable document templates. The storage module can includes a computer storage product such as, for example, a random access memory (RAM), a memory buffer, a hard drive, a database, an erasable programmable read-only memory (EPROM), an electrically erasable read-only memory (EEPROM), and/or so forth. The storage module is operatively coupled to the composition module and can store instructions to cause the composition module to execute modules, processes and/or functions. In some embodiments, the storage module can store links to locations of fonts and/or images in addition to, or in lieu of, storing locally.

Figure 2:
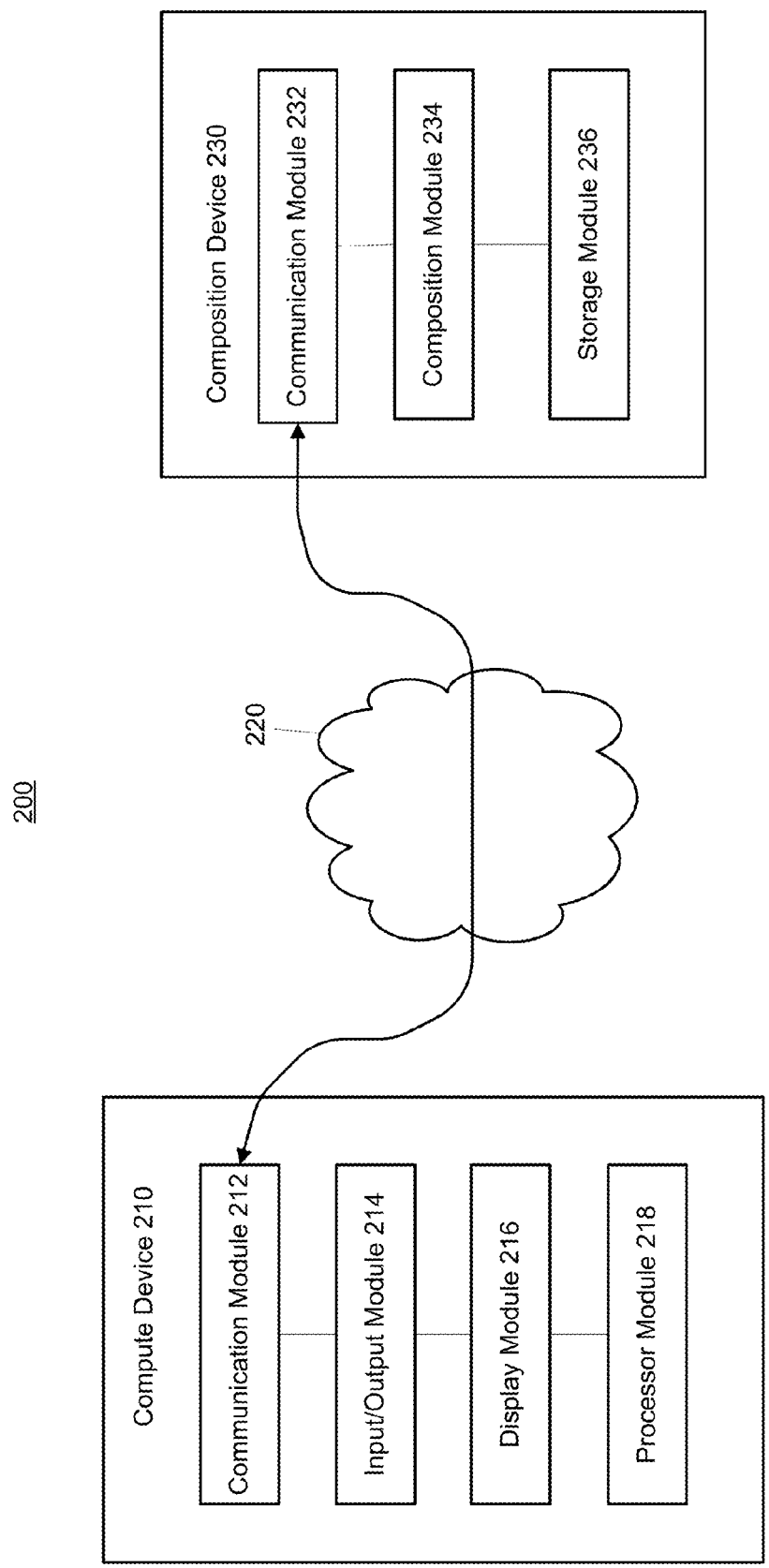
FIG. 2 is a schematic diagram of a printable document viewer optimization system according to an embodiment.

FIG. 2 depicts schematic view of a printable document viewer optimization system ("system") 200 according to an embodiment. System 200 can be similar to, and include similar elements to, system 100 described above. By way of example, system 200 can include a compute device 210 and a composition device 230 which can be similar to compute device 110 and composition device 130, respectively. System 200 can be used to define a printable document on a compute device based on a template stored on a composition device. Compute device 210 includes a communication module 212, an input/output module 214, a display module 218, and a processor module 218. Composition device 230 includes a communication module 232, a composition module 234, and a storage module 236.

Figure 3:
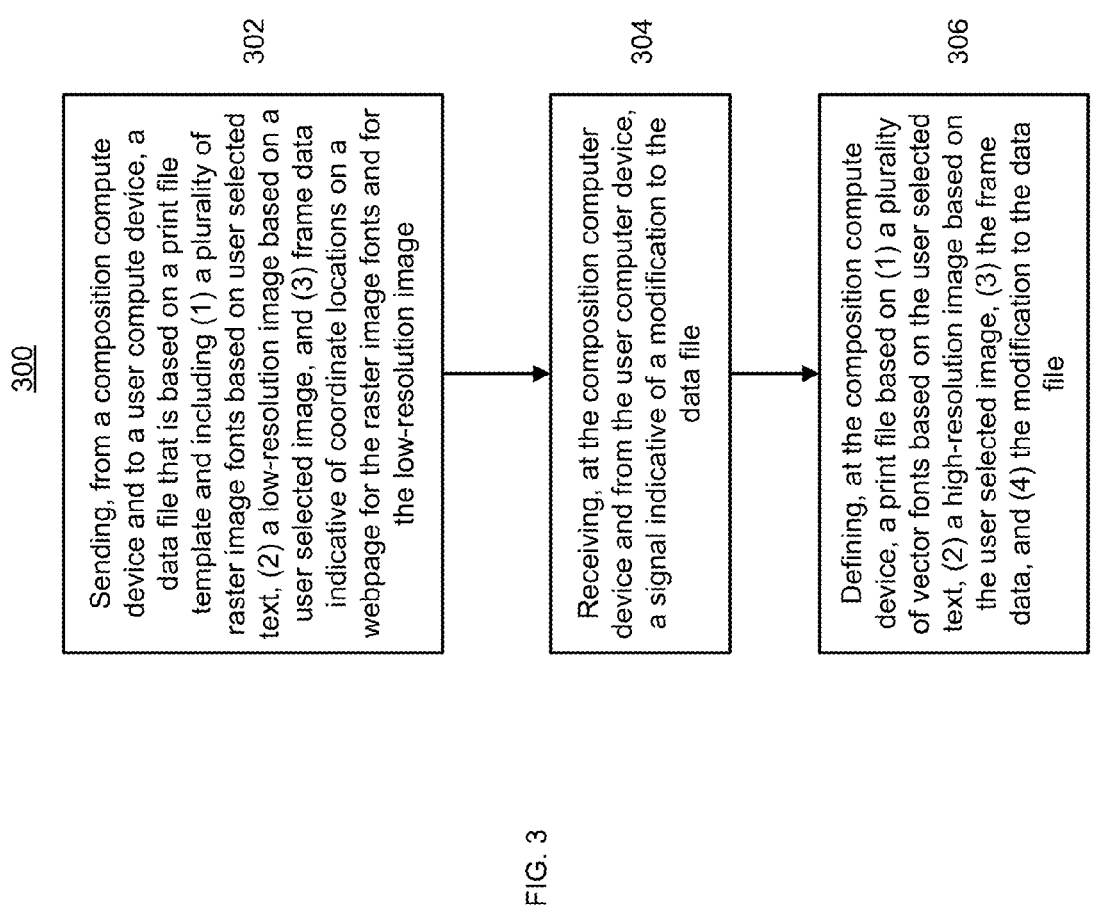
FIG. 3 is a flow chart showing a method of operating a printable document viewer optimization system according to an embodiment.

FIG. 3 is a flow chart depicting a method 300 for operating a printable document viewer optimization system. Method 300 includes sending, from a composition compute device and to a user compute device, a data file that is based on a print file template, at 302. The data file includes (1) a plurality of raster image fonts based on user selected text, (2) a low-resolution image based on a user selected image, and (3) frame data indicative of coordinate locations on a webpage for the raster image fonts and for the low-resolution image. Method 300 includes receiving, at the composition computer device and from the user computer device, a signal indicative of a modification to the data file, at 304. Method 300 includes defining, at the composition compute device, a print file, at 306. The print file is based on (1) a plurality of vector fonts based on the user selected text, (2) a high-resolution image based on the user selected image, (3) the frame data, and (4) the modification to the data file.

Figure 4:
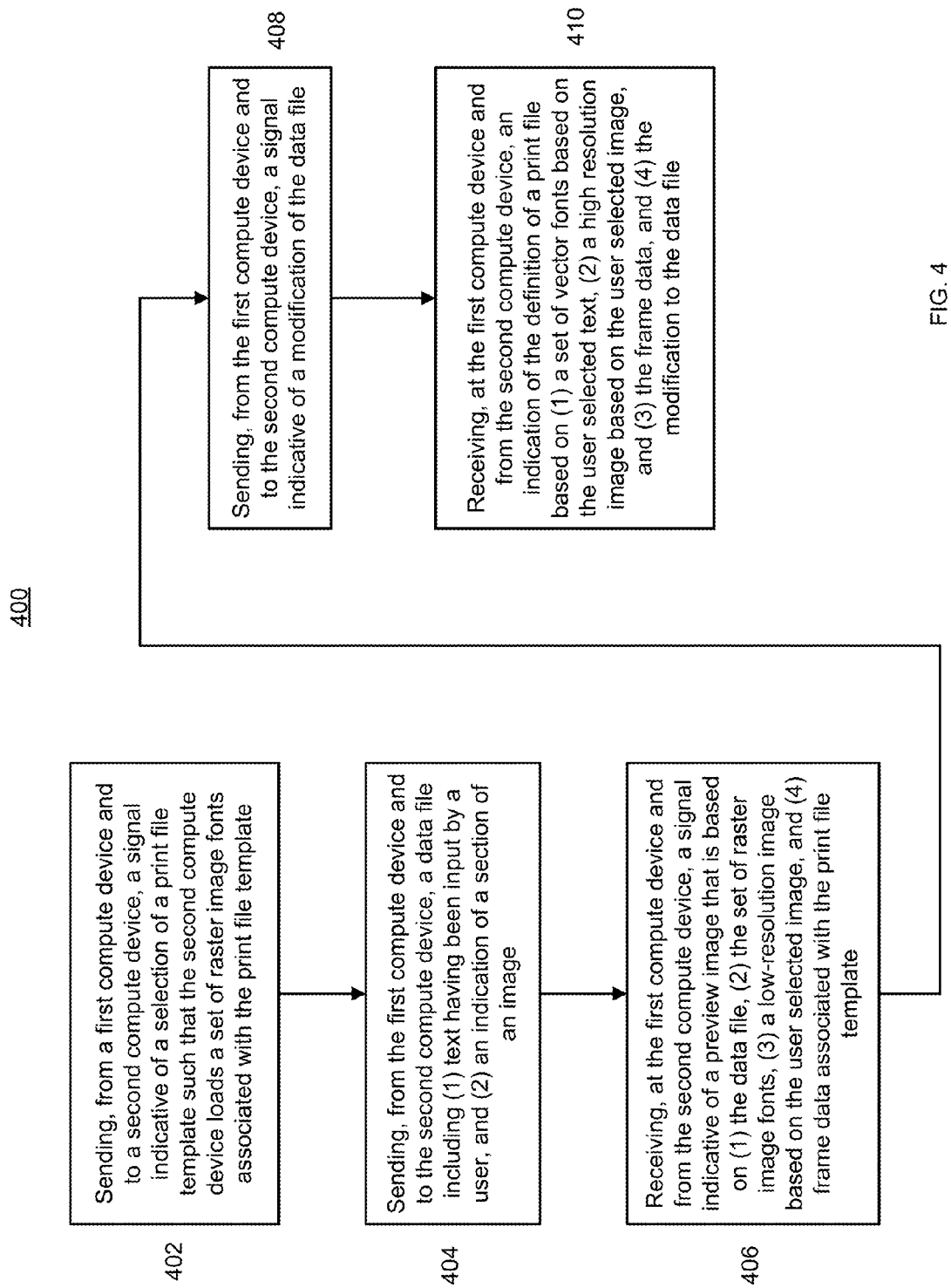
FIG. 4 is a flow chart showing a method of operating a printable document viewer optimization system according to an embodiment.

FIG. 4 is a flow chart depicting a method 400 for operating a printable document viewer optimization system. Method 400 includes sending, from a first compute device and to a second compute device, a signal indicative of a selection of a print file template such that the second compute device loads a set of raster image fonts associated with the print file template, at 402. Method 400 includes sending, from the first compute device and to the second compute device, a data file including (1) text having been input by a user, and (2) an indication of a section of an image, at 404. Method 400 includes receiving, at the first compute device and from the second compute device, a signal indicative of a preview image, at 406. The preview image is based on (1) the data file, (2) the set of raster image fonts, (3) a low-resolution image based on the user selected image, and (4) frame data associated with the print file template. Method 400 includes sending, from the first compute device and to the second compute device, a signal indicative of a modification of the data file, at 408. Method 400 includes receiving, at the first compute device and from the second compute device, an indication of the definition of a print file, at 410. The print file is based on (1) a set of vector fonts based on the user selected text, (2) a high resolution image based on the user selected image, (3) the frame data, and (4) the modification to the data file.

In an example, and with respect to FIG. 2, one or more users can utilize system 200, specifically, compute device 210, to select a printable document template ("template"), modify the template, finalize the template, and send a printable document to be printed. As used in this example, the template can be a template for a business card, however, in other embodiments; any type of template can be used, for example, a restaurant menu, sales flyer, etc. Initially, a template designer can design a business card template including a font size and style, images, and frame information, for example, coordinate locations for the image and text locations. In some embodiments, the template designer can design the business card template on composition device 230, via, for example a general compute device (not shown) and can store the business card template in the storage module 236. In other embodiments, the template designer can design the business card template on a design device (not shown) operatively coupled to the composition device 230, via, for example network 220, and can send the business card template to the composition device 230 from the design device, and the composition device 230 can store the business card template in the storage module 236.

In the example, a user can use compute device 210, and can send a signal to composition device 230 including a request to view available templates, including the business card template. In response to the request, composition module 234 of composition device 230 can retrieve, from storage module 236, previews, for example thumbnails, of the available templates, and can send a data steam indicative of the previews to the compute device 210. Display module 216 can cause the previews to be displayed, and the user can select, via and input device operatively coupled to input module 214, the business card template. In response to the selection, composition device 230 can receive a request from compute device 110, and can retrieve, from storage module 236, the business card template including frame and coordinate information, the associated lower resolution image, and the associated downgraded font set. In some embodiments, and as discussed above, the composition module 234 can retrieve the vector font set associated with the template, and can rasterize the characters associated with the template after selection of the template. For example, a template can be designed to user 30 characters of the same size from a full font set that includes 80 characters in a variety of sizes. Composition device 230 can send, via communication module 232, network 220, and communication module 212, a markup language data stream, including the frame and coordinate data, the low resolution image, and the downgraded font set, to the processor module 218.

In the example, the processor module 218, executing the browser program, can cause display module 216 to display a representation of the business card template based on the frame and coordinate data, the lower resolution image, and the downgraded font set. The user can modify the representation of the business card template, for example, by adding and/or otherwise changing text, resizing and/or otherwise changing the image, changing the frame and/or coordinate information, for example, moving a location of one or more text locations and/or the image location. The processor module 218 can receive the modifications to the representation of business card template from a user via input/output module 214, and can send a data stream to the composition module 232 including a signal indicative of the modifications to the representations. Said another way, the data stream can only include data associated with the changes to the frames and coordinates, text and images, but not the actual frames and coordinates, text or images.

In the example, composition device 230 can send, via communication module. 232, network 220, and communication module 212, a markup language data stream, including the modified frame and coordinate data, the modified low resolution image, and the modified downgraded font set, to the processor module 218. In some embodiments, a user may only modify a portion of the template. In such embodiments, the markup language data stream can include a combination of modified and original data. For example, if the user did not modify the image, a new copy of the image may not be transmitted. The processor module 218, executing the browser program, can cause display module 216 to display a representation of the modified business card template based on the modified frame and coordinate data, the modified lower resolution image, and the modified downgraded font set. The user of compute device 210 can continue to modify the business card template or can indicate that the printable document is final. In some embodiments, additional users can preview and modify the template at any and all stages of modification, and can modify the template as described above. The composition module 234 can receive an indication that the print document is final and, in response to that indication, can compose the print file, for example, as a PPML file, the composed print file including the vector fonts associated with the business card template, and the higher resolution image associated with the business card template. The composed print file can be stored and/or transmitted to a printer.

While shown in FIGS. 1 and 2 as including a single compute device 110, 210, in some embodiments, a system can include more compute devices such that more than one user can select and/or modify a template, and/or such that a user can selected or modify a template from one or more compute devices.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combi-nations and/or sub-combinations of the functions, components and/or features of the different embodiments described.

Where methods described above indicate certain events occurring in certain order, the ordering of certain events can be modified. Additionally, certain of the events can be performed concurrently in a parallel process when possible, as well as performed sequentially as described above. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A method, comprising:
receiving, at a composition computer device and from a user computer device a first data file including (1) text input by a user, and (2) an indication of an image selected by the user;
defining, at the composition compute device, a plurality of raster image fonts rasterized from a full vector font set including a subset of characters and/or sizes based on the text;
sending, from the composition compute device and to the user compute device, a second data file that is based on a print file template and including (1) the plurality of raster image fonts based on the text input, (2) a low-resolution image based on selected the indication of the image, and (3) frame data indicative of coordinate locations on a webpage for the plurality of raster image fonts and for the low-resolution image;
receiving, at the composition computer device and from the user computer device, a signal indicative of a modification to the second data file, the signal including data associated with changes to frames, coordinates, text and/or images, but not actual frames, text, and/or images; and
defining, at the composition compute device, a print file based on (1) a plurality of vector fonts based on the user selected text, (2) a high-resolution image based on the user selected image, (3) the frame data, and (4) the modification to the second data file.

2. The method of claim 1, wherein the plurality of raster images fonts include a plurality of bitmap fonts.

3. The method of claim 1, wherein the modification of the data file includes a modification to a coordinate location on the print file template for the low resolution image.

4. The method of claim 1, the method further comprising:
sending, from a composition compute device and to a user compute device, a third data file that is based on the print file template including (1) a second plurality of raster image fonts based on second user selected text, (2) a second low-resolution image based on a second user selected image, (3) second frame data indicative of coordinate locations on a second webpage for the second plurality of raster image fonts based on second user selected text and for the second low-resolution image based on second user selected image, and (4) a modification of the third data file.

5. The method of claim 1, further comprising receiving, at the composition compute device and from the user compute device, a signal indicative that the print file is final.

6. The method of claim 1, wherein the second data file is an extensible markup language file.

7. The method of claim 1, wherein the second data file does not include vector fonts.

8. The method of claim 1, wherein the plurality of raster image fonts includes only fonts to render the text.

9. A method, comprising:
sending, from a first compute device and to a second compute device, a signal indicative of a selection of a print file template such that the second compute device loads a vector font set associated with the print file template;
sending, from the first compute device and to the second compute device, a data file including (1) text input by a user, and (2) an indication of an image selected by the user;
receiving, at the first compute device and from the second compute device, a signal indicative of a preview image that is based on (1) the data file, (2) a set of raster image fonts rasterized from the vector font set including a subset of characters and/or sizes based on the text input by the user, (3) a low-resolution image based on the image, and (4) frame data associated with the print file template;
sending, from the first compute device and to the second compute device, a signal indicative of a modification of the data file, the signal including data associated with changes to frames, coordinates, text and/or images, but not actual frames, text, and/or images; and
receiving, at the first compute device and from the second compute device, an indication of the definition of a print file based on (1) a set of vector fonts based on the text, (2) a high resolution image based on the image, and (3) the frame data, and (4) the modification to the data file.

10. The method of claim 9, further comprising sending, from the first compute device and to a display, the signal indicative of the preview image.

11. The method of claim 9, wherein the modification of the data file includes a modification to a coordinate location on the print file template for the low resolution image.

12. The method of claim 9, wherein the data file is a data interchange format file.

13. The method of claim 9, wherein the data file is an extensible markup language file.

14. An apparatus, comprising:
a composition compute device configured to send, to a user compute device, a data file that is based on a print file template and including (1) a plurality of raster image fonts based on user selected text, the plurality of raster image fonts rasterized from a vector font set including a subset of characters and/or sizes to render the user selected text, and (2) frame data indicative of coordinate locations on a webpage for the raster image fonts,
the composition computer device configured to receive, from the user compute device, a signal indicative of a modification to the data file, the signal including data associated with changes to frames, coordinates, text and/or images, but not actual frames, text, and/or images, and
the composition computer device configured to define a print file based on (1) a plurality of vector fonts from the vector font set based on the user selected text, (2) the frame data, and (3) the modification to the data file.

15. The apparatus of claim 14, wherein the plurality of raster images fonts include a plurality of bitmap fonts.

16. The apparatus of claim 14, wherein the data file includes a low resolution image and the modification of the data file includes a modification to a coordinate location on the print file template for the low resolution image.

17. The apparatus of claim 14, wherein the data file is a first data file, the user selected text is a first user selected text, and the frame data is first frame data, the apparatus further comprising:
the composition compute device configured to send, to the user compute device, a second data file that is based on the print file template including (1) a second plurality of raster image fonts based on the second user selected text, (2) a second low-resolution image based on a second user selected image, (3) second frame data indicative of coordinate locations on a second webpage for the second plurality of raster image fonts based on second user selected text and for the second low-resolution image based on user selected image, and (4) the modification of the data file.

18. The apparatus of claim 14, wherein the composition compute device is configured to receive a signal indicative that the print file is final.

19. The apparatus of claim 14, wherein the data file is an extensible markup language file.

20. The apparatus of claim 14, wherein the data file does not include vector fonts.

\* \* \* \* \*